United States Patent
Ward et al.

(10) Patent No.: US 7,551,341 B1
(45) Date of Patent: Jun. 23, 2009

(54) SERIAL MODULATION DISPLAY HAVING BINARY LIGHT MODULATION STAGE

(75) Inventors: Gregory John Ward, Albany, CA (US); Gerwin Damberg, Vancouver (CA); Helge Seetzen, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 12/021,206

(22) Filed: Jan. 28, 2008

(51) Int. Cl.
G02F 1/07 (2006.01)
(52) U.S. Cl. ............ 359/259; 359/248; 359/250
(58) Field of Classification Search ............ 359/259, 359/250, 248, 245, 237
See application file for complete search history.

(56) References Cited

U.S. PATENT DOCUMENTS

| | | | |
|---|---|---|---|
| 4,978,950 A | 12/1990 | Capps | |
| 6,094,187 A | 7/2000 | Jones et al. | |
| 6,628,329 B1 * | 9/2003 | Kelly et al. | 348/252 |
| 6,891,672 B2 | 5/2005 | Whitehead et al. | |
| 7,050,122 B2 | 5/2006 | Gibbon et al. | |
| 7,224,335 B2 * | 5/2007 | Gibbon et al. | 345/84 |
| 7,410,261 B2 * | 8/2008 | Magarill | 353/33 |
| 2005/0190140 A1 | 9/2005 | Asahi et al. | |
| 2006/0082692 A1 * | 4/2006 | Kamijima et al. | 349/5 |
| 2007/0126992 A1 | 6/2007 | Penn | |
| 2007/0257870 A1 * | 11/2007 | Knipe | 345/84 |
| 2008/0143978 A1 * | 6/2008 | Damera-Venkata et al. | 353/94 |
| 2008/0247598 A1 * | 10/2008 | Movellan et al. | 382/100 |

FOREIGN PATENT DOCUMENTS

| | | |
|---|---|---|
| WO | 00/40018 A1 | 7/2000 |
| WO | 01/69941 A2 | 9/2001 |
| WO | 03/077013 A2 | 9/2003 |

OTHER PUBLICATIONS

Landreth, B. et al., "Analog response from binary spatial light modulators", SPIE vol. 1296, Advances in Optical Information Processing IV (1990) pp. 64-72.

* cited by examiner

*Primary Examiner*—Timothy J Thompson (57) ABSTRACT

A display has first and second spatial light modulators for modulating light from a light source. The first spatial light modulator has a plurality of elements switchable between ON and OFF states according to a pattern having a spatially-varying density. Transfer optics blur and carry light modulated by the first spatial light modulator to the second spatial light modulator to yield a light field at the second spatial light modulator. The second spatial light modulator has a plurality of elements switchable between ON and OFF states to perform temporal dithering of the light field to provide a reconstruction of the image.

24 Claims, 9 Drawing Sheets

SERIAL MODULATION DISPLAY HAVING BINARY LIGHT MODULATION STAGE

TECHNICAL FIELD

The invention relates to electronic displays such as computer displays, television displays, digital cinema projectors, home theatre displays, displays in simulators for vehicles such as aircraft, ships, trucks, cars and the like, gaming system displays, displays in simulation-type amusement rides, digital picture frames, HDTV monitors, high dynamic range (HDR) imaging systems and the like. The invention relates particularly to displays wherein light is modulated in two stages.

BACKGROUND

Electronic displays are used in a wide range of applications. Some electronic displays have a spatial light modulator. Elements of the spatial light modulator are controlled in response to image data to yield an image that can be observed by viewers. The elements of some spatial light modulators are 'binary' elements which have two states. In one state the element passes light to a viewing area and in another state the element does not pass light to the viewing area.

A digital mirror device (DMD) is one example of a binary spatial light modulator. A DMD provides an array of mirrors. Each mirror can be switched between two states. The state of a mirror can determine whether or not light incident on the DMD at the location of the mirror will pass along a path that will take it to a viewing area. When a mirror is in an 'ON' state, light is directed to a location in a viewing area that corresponds to the mirror. When the mirror is in an 'OFF' state the light is directed along a path that does not take it to the viewing area. It is typical for light in the OFF state to be directed to a heat sink.

An element of a binary spatial light modulator can be controlled to display intermediate brightness values by rapidly turning it on and off. The brightness that will be perceived by a human observer can be altered by adjusting the relative amounts of time during which the element is in its ON and OFF states.

Some displays provide serial light modulators. In such displays, light is modulated serially by first and second light modulators. Examples of displays are described in PCT Patent Publication No. WO2003/077013 and U.S. Pat. No. 6,891,672. PCT Patent Publication No. WO2003/077013 describes a light source having an array of controllable light-emitting elements, and a spatial light modulator having an array of elements of controllable transmissivity for modulating light from the light source. U.S. Pat. No. 6,891,672 describes first and second spatial light modulators arranged in series to modulate light from a light source. Each spatial light modulator has an array of controllable pixels, wherein each pixel of one of the spatial light modulators corresponds to a plurality of pixels of the other one of the spatial light modulators.

There is a need for cost effective displays capable of providing high image quality.

SUMMARY OF THE INVENTION

This invention has a number of aspects. One aspect of the invention provides a display. The display may comprise, for example, a computer display, a television, a digital projector or the like. The display comprises a light source capable of directing light onto a first spatial light modulator. The first spatial light modulator comprises a plurality of first elements switchable between ON and OFF states. The display has transfer optics arranged to direct light modulated by the first spatial light modulator onto a second spatial light modulator and a driver configured to generate first and second control signals for the first and second spatial light modulators respectively based on image data. The driver is configured to generate a pattern based upon the image data. The pattern has a spatially-varying density. The pattern may comprise a spatial dither derived from the image data for example. The driver is configured to generate the first control signal so as to set elements of the first spatial light modulator according to the pattern. The transfer optics are characterized by a transfer function that blurs light originating from the first spatial light modulator at the second spatial light modulator.

The second spatial light modulator may also comprise a plurality of elements switchable between ON and OFF states. In such a case, the driver may be configured to switch the elements of the second spatial light modulator between their ON and OFF states multiple times during an image frame. The switching of the elements of the second spatial light modulator may be performed, for example, according to a binary pulse-width modulation scheme.

In some embodiments, the driver is configured to estimate a light field at the second spatial light modulator corresponding to the pattern and to base the second control signals on the estimated light field.

Another aspect of the invention provides a display comprising: means for generating light; first means for binary modulation of the light, the first means comprising a plurality of first elements switchable between ON and OFF states; means for blurring light modulated by the first means and directing the blurred light onto a binary spatial light modulator; means for generating first control signals for the first means based on the image data, the means for generating first control signals comprising means for generating a pattern based upon the image data, the pattern having a spatially-varying density; and means for generating second control signals for the binary spatial light modulator based on the image data.

Another aspect of the invention provides a method for displaying an image. The method comprises setting elements of a first binary spatial light modulator according to a binary pattern based on the image. The pattern has a spatially-varying density. The method proceeds by blurring and transferring to a second spatial light modulator an image of the first binary light modulator to yield a light field at the second spatial light modulator; and modulating the light field with the second spatial light modulator to yield a reconstruction of the image.

In some embodiments, modulating the light field with the second spatial light modulator comprises performing temporal dithering of the light field by switching elements of the second spatial light modulator between ON and OFF states.

Some embodiments involve computing an estimate of the light field corresponding to the pattern and controlling the second spatial light modulator according to the image data and the estimate of the light field. The computed estimate may take into consideration a transfer function that characterizes the blurring.

Another aspect of the invention provides a controller for a display comprising first and second spatial light modulators. The controller is configured to generate a first control signal for the first spatial light modulator to set each of a plurality of elements of the first spatial light modulator to an ON or OFF state according to a binary pattern having a spatially-varying density based on an image; and generate a second control signal for the second spatial light modulator to switch each of a plurality of elements of the second spatial light modulator between ON and OFF states to perform temporal dithering of light incident on the element. The second control signal is responsive to an estimated light field of light modulated by the first spatial light modulator and image data.

Further aspects of the invention as well as features of specific embodiments of the invention are described below.

BRIEF DESCRIPTION OF THE DRAWINGS

The accompanying drawings illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
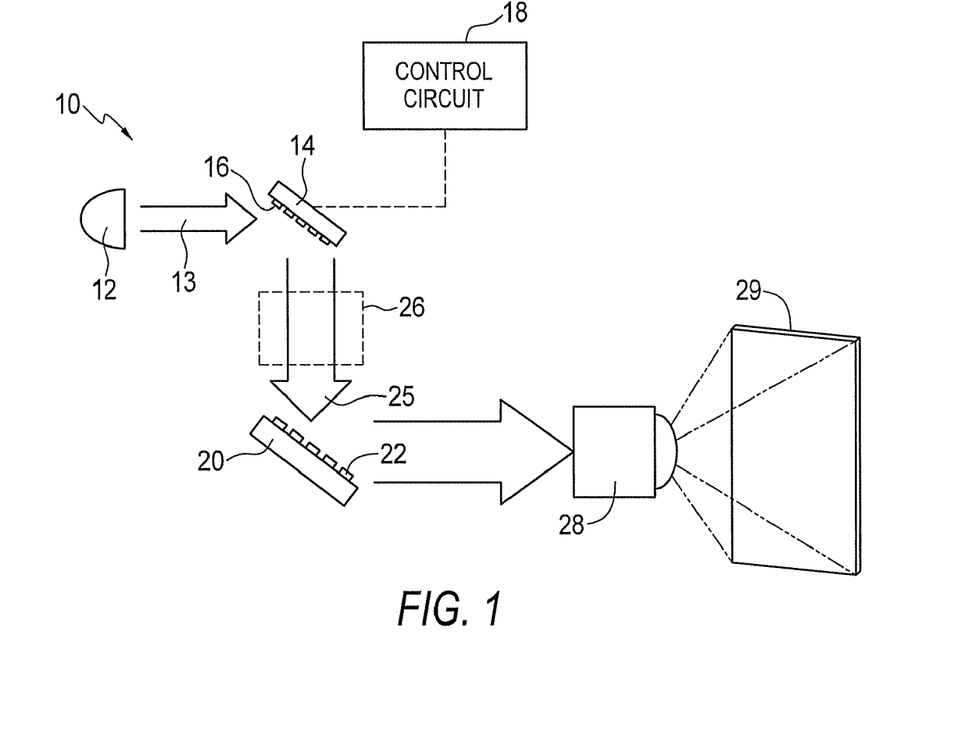
FIG. 1 is a schematic diagram illustrating a monochrome display according to a simple embodiment of the invention.

FIG. 1 shows a monochrome display 10 according to an example embodiment of the invention. Display 10 comprises a light source 12. Light 13 from light source 12 illuminates a first spatial light modulator 14. Light source 12 may comprise, for example:
  a laser;
  a xenon lamp;
  an array of laser diodes or other solid-state light emitters;
  an arc lamp; or
  the like.

First spatial light modulator 14 comprises a plurality of controllable elements 16. Elements 16 can be switched between ON and OFF states by a suitable control circuit 18. When it is in its ON state, an element 16 allows incident light 13 that hits the element to pass to a corresponding area of a second spatial light modulator 20. When it is in its OFF state, the amount of light that passes from the element 16 to the corresponding area of the second spatial light modulator 20 is diminished. Ideally, when an element 16 is in its OFF state, substantially no light from the element 16 reaches the corresponding area of the second spatial light modulator 20.

First spatial light modulator 14 may be implemented in a wide variety of ways. First spatial light modulator 14 comprises a DMD in some embodiments. In other embodiments, first spatial light modulator 14 comprises an array of optical reflective or transmissive elements that can be switched between ON and OFF states by other mechanisms. For example, in some such embodiments first spatial light modulator 14 comprises an LCD panel. LCOS chip or the like. In other embodiments, the functions of light source 12 and first spatial light modulator 14 are combined. In such embodiments, first spatial light modulator 14 may comprise an array of light sources such as lasers that can be switched on or turned off (or otherwise switched between light-emitting and dark states).

Second spatial light modulator 20 comprises a plurality of controllable elements 22. Each controllable element 22 can be controlled to select a proportion of the light 25 that is incident on the element 22 from first spatial light modulator 14 that is transmitted to a viewing area.

Second spatial light modulator 22 may be provided by any suitable technology, such as, for example:
  a liquid crystal display (LCD) panel;
  a liquid crystal on silicon LCOS chip;
  a micro-mirror array;
  magneto-optic devices;
  light valves;
  etc.

In some embodiments, second spatial light modulator 20 comprises optical reflective or transmissive elements that can be switched between ON and OFF states. In such embodiments, second spatial light modulator 20 may be controlled by a controller that sets its elements to be ON or OFF.

In some embodiments, first spatial light modulator 14 and second spatial light modulator 20 each comprise a DMD or other two-dimensional array of controllable micro-mirrors. Such embodiments have the advantage that DMDs can be sourced relatively inexpensively and there is currently a wide range of support for the design and manufacture of devices which incorporate DMDs.

Transfer optics 26 carry light 25 from first spatial light modulator 14 to second spatial light modulator 20. Light 25 is capable of illuminating the entire active area of second light modulator 20 when all elements 16 of first spatial light modulator 14 are ON. Light 25 could spread past the edges of second spatial light modulator 20.

Transfer optics 26 blur light 25. Transfer optics 26 may be characterized by a transfer function which at least approximates how light 25 issuing from a point on first spatial light modulator 14 will be spread over second spatial light modulator 20.

The pattern of light incident on second light modulator 20 can be estimated or determined from the configuration of first modulator 14 (i.e. from which elements 16 are ON and which elements 16 are OFF) and the transfer function.

It can be appreciated that, due to the blurring introduced by transfer optics 26, the light 25 incident on any element 22 of second spatial light modulator 20 may arise from multiple elements 16 of first spatial light modulator 14. The number of elements 16 of first spatial light modulator 14 that can contribute significant amounts of light to the illumination of an element 22 of second spatial light modulator 20 depends primarily upon the width of the transfer function and the size of elements 16 of first spatial light modulator 14.

In some embodiments, first and second spatial light modulators 14 and 20 have the same or similar numbers of controllable elements. In some embodiments, first spatial light modulator 14 has significantly fewer controllable elements 16 than second spatial light modulator 20 has controllable elements 22. In some embodiments, first spatial light modulator 14 comprises an array of from about 140 to about 1600 elements 16. Where the first and second spatial light modulators have different spatial resolutions, in some embodiments the second spatial light modulator has the higher resolution and in some embodiments the first spatial light modulator has the higher resolution.

In some embodiments, controllable elements 16 of first spatial light modulator 14 are arranged in a regular array. The array may be rectangular and may comprise M rows and N columns of controllable elements 16. In some embodiments, controllable elements 22 of second spatial light modulator 20 are arranged in a regular array. For example, the array may be rectangular and may comprise P rows and Q columns. In some embodiments, second spatial light modulator 20 has a width and height having a ratio of 16:9.

Some embodiments take advantage of the fact that a DMD or other spatial light modulator having fewer elements in the same area may have a higher fill factor than a DMD or other spatial light modulator having more elements in the same area. Thus, all other factors being equal, the maximum amount of light that a lower-resolution first spatial light modulator can pass on to a second spatial light modulator can be greater than the maximum amount of light that can be passed by a higher-resolution spatial light modulator.

In some embodiments, the optical fill factor of a lower-resolution one of the first and second spatial light modulators is at least 85%. In some embodiments, the optical fill factors of both the first and second spatial light modulators is at least 85%.

In some embodiments, first spatial light modulator 14 has a total number of elements 16 that is at least a factor of two to four smaller than a total number of elements 22 in second spatial light modulator 20. The blur introduced by transfer optics 26 reduces or eliminates any 'blocking' that could be caused by the low resolution of first spatial light modulator 14.

Transfer optics 26 may comprise any suitable arrangement of lenses, mirrors, diffusers or the like which transfers light 25 originating from first spatial light modulator 14 (primarily elements 16 that are in their ON states) to second spatial light modulator 20. Some examples of suitable transfer optics 26 are:
  a lens or system of lenses that projects an out-of-focus image of first modulator 14 onto second modulator 20;
  a lens or system of lenses in combination with a diffuser.

It is expedient to provide an optical system 26 for which the transfer function is substantially the same for all elements of first modulator 14. However, an optical system 26 that introduces both blur and distortion could be used if the distortion can be characterized. It is also expedient to provide an optical system 26 for which the transfer function has circular symmetry. However, an optical system 26 that has a more complicated transfer function could be used as long as the transfer function can be suitably characterized As discussed below, some embodiments estimate the distribution of light at second modulator 20 for different configurations of first modulator 14. In such embodiments, it can be desirable to provide transfer optics 26 characterized by a transfer function that blurs over a relatively small area as this reduces the computational requirements for estimating the resulting light field at second spatial light modulator 20. In example embodiments, the transfer function of transfer optics 26 may be approximated to an acceptable degree of accuracy by a spatial low-pass filter or a smoothing operator characterized by a standard deviation larger than the spacing between adjacent elements 16 of first spatial light modulator 14.

Where display 10 is a projection-type display, a suitable projection lens 28 focuses light from second spatial light modulator 20 onto a screen 29 for viewing. Screen 29 may comprise a front-projection screen or a rear-projection screen.

In an example embodiment, first and second modulators 14 and 20 each comprise a DMD, and light source 12 comprises a laser light source.

Figure 2:
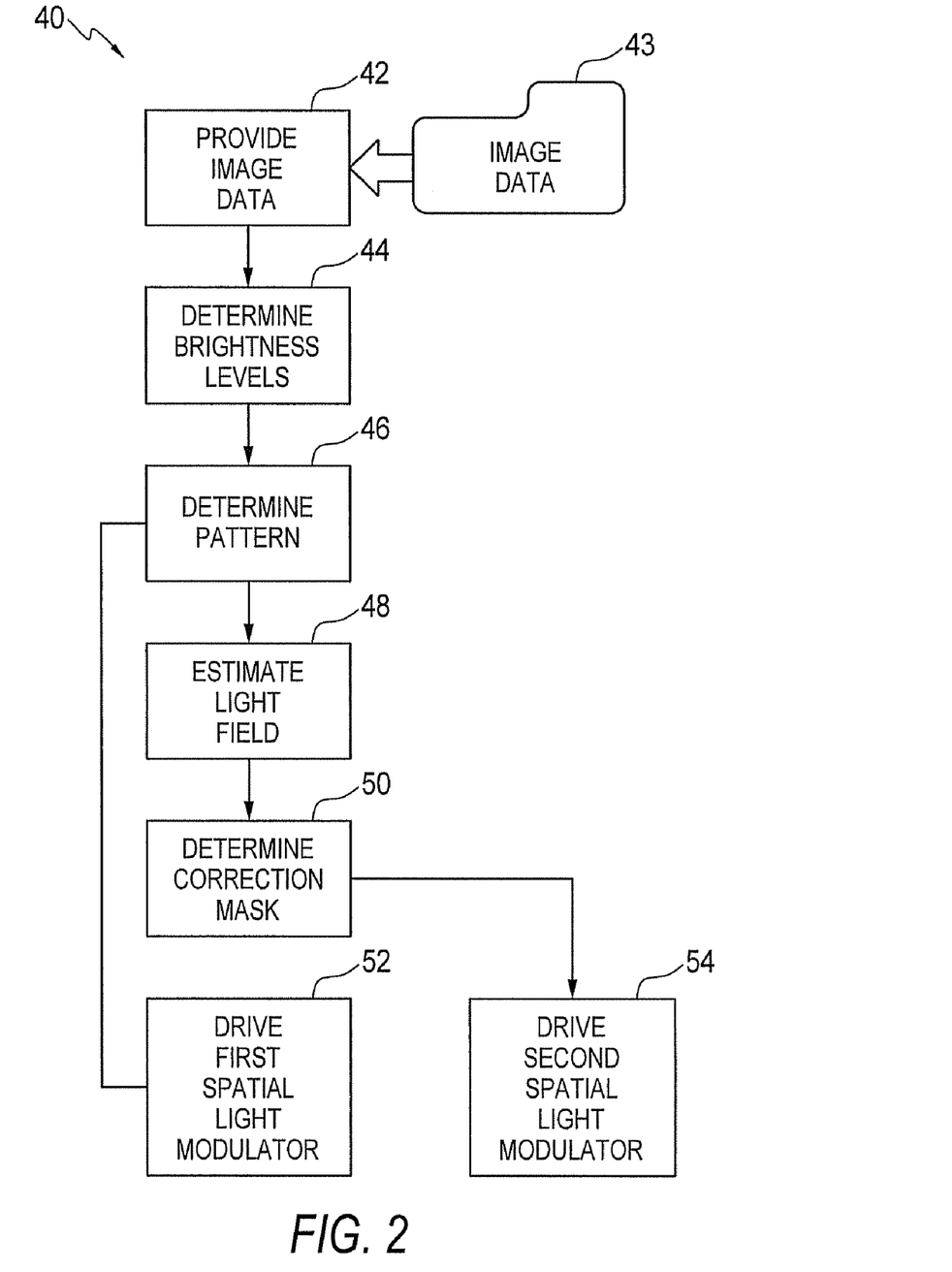
FIG. 2 is a flow chart which illustrates a method for displaying images according to an embodiment of the invention.

FIG. 2 illustrates a method 40 for using a display like display 10 to display images. In block 42, image data 43 is provided. Image data 43 defines an image to be displayed using display 10. For example, the image data may specify a desired brightness as a function of position for each element of second spatial light modulator 20. Image data 43 may comprise a frame of a video sequence, a still image, or the like. The image data may be represented in any suitable format. Some example formats in which image data may be presented are:
  JPEG
  JPEG-HDR
  TIFF
  GIF
  OpenEXR
  Artizen™ file format
  Radiance™ file format
  PNG (Portable Network Graphics),
  bit-map (e.g. .BMP)
  JPEG2000
  MPEG
  MPEG-HDR
  DPX format (ANSI/SMPTE 268M-1994, *SMPTE Standard for File Format for Digital Moving-Picture Exchange* (DPX), v 1.0, 18 Feb. 1994)
  DCI digital cinema format
  Cineon™ format
  etc.

In some embodiments, the format is a high dynamic range (HDR) format providing more than 24 bits per pixel.

In blocks 44 to 50, method 40 derives driving signals for the elements 16 of first spatial light modulator 14. The driving signals can be applied to set each element 16 to be ON or OFF in a pattern suitable for reproducing the image of image data 43. Block 44 determines grey scale brightness levels that should be provided for each different area of an output image to be projected onto screen 29. Each of these areas corresponds to an area of first spatial light modulator 14. The areas of first spatial light modulator 14 each encompass a plurality of elements 16. Block 44 may, for example, comprise averaging together pixel values for portions of the image defined by image data 43 that correspond to each area of the output image.

Block 46 determines a pattern of ON and OFF states that can be applied to the elements of first spatial light modulator 14 such that in each of the areas of first spatial light modulator 14, the proportion of ON elements 16 varies with the corresponding grey scale brightness level determined in block 44. For example, for areas corresponding to bright portions of the image, the pattern may specify that all of the elements 16 in the corresponding area of first spatial light modulator 14 should be ON. For areas corresponding to dim portions of the image, the pattern may specify that most or all of the elements 16 in the corresponding area of first spatial light modulator 14 should be OFF.

Where an area of the pattern corresponds to an intermediate brightness then an appropriate proportion of elements 16 in the area will be ON and the remainder OFF. In this case it is desirable that the ON elements 16 be reasonably evenly distributed over the area. For example, elements 16 in the area may be distributed according to a suitable dithering pattern that has the desired ratio of ON to OFF elements 16.

A dithering pattern may be generated, for example, by:
- generating a luminance map that indicates, for each pixel of the image, how much luminance should be allowed to pass to a viewer;
- boosting the luminance map to yield a boosted luminance map;
- downsampling the boosted luminance map to a resolution matching that of first spatial light modulator 14 to yield a downsampled grey scale image; and
- dithering the resulting downsampled grey-scale image to yield a binary image.

Boosting the luminance map is desirable to ensure that there will be sufficient light at each element of second spatial light modulator 20 that the amount of light specified by image data 43 will be available to pass to a viewer.

Dithering may be performed in any suitable manner. Dithering software and hardware are commercially-available. In some embodiments, dithering is performed for blocks of elements 16 on first spatial light modulator 14. For example, dithering performed over a 16×16 block of elements 16 can produce light outputs which vary in 256 steps from no output (apart from any leakage light) wherein all 256 elements in the block are OFF, to a maximum output level wherein all 256 elements in the block are ON. Dithering may comprise looking up predetermined dither patterns in a table or other suitable data structure or computing dither patterns which provide the appropriate densities of ON elements 16 by applying a suitable dithering algorithm. The dithering algorithm may be implemented in software, hardware or a suitable combination thereof.

Some example dithering algorithms include:
- Dividing an image into tiles, assigning a rounding bias to each pixel position within a tile, adding the rounding bias to the pixel value and then rounding the resulting value down. Each pixel in the tile will then have a high value (e.g. "1" or ON) or a low value (e.g. "0" or OFF).
- Floyd-Steinberg dithering algorithms.
- Average dithering (which may involve, for example, selecting a threshold pixel value, which may be the average value of image pixels and then quantizing pixels to low or high values (e.g. 0 or 1) based upon whether the values for the pixels are greater than or less than the threshold), and using it as a global threshold in deciding whether a pixel should be quantized to 0 or to 1. The case where the pixel value is equal to the threshold may be handled in any suitable way. In an embodiment all pixels whose values are above the threshold are quantized to 1 and all other pixels are quantized to a value of 0.
- Random dithering.
- Error-diffusion dithering.
- Veryovka-Buchanan dithering algorithms.
- Riemersma dithering.
- etc.

Matlab™ and other computation and/or image processing software packages include software which implements dithering algorithms that may be used in embodiments of the invention.

Figure 3A:
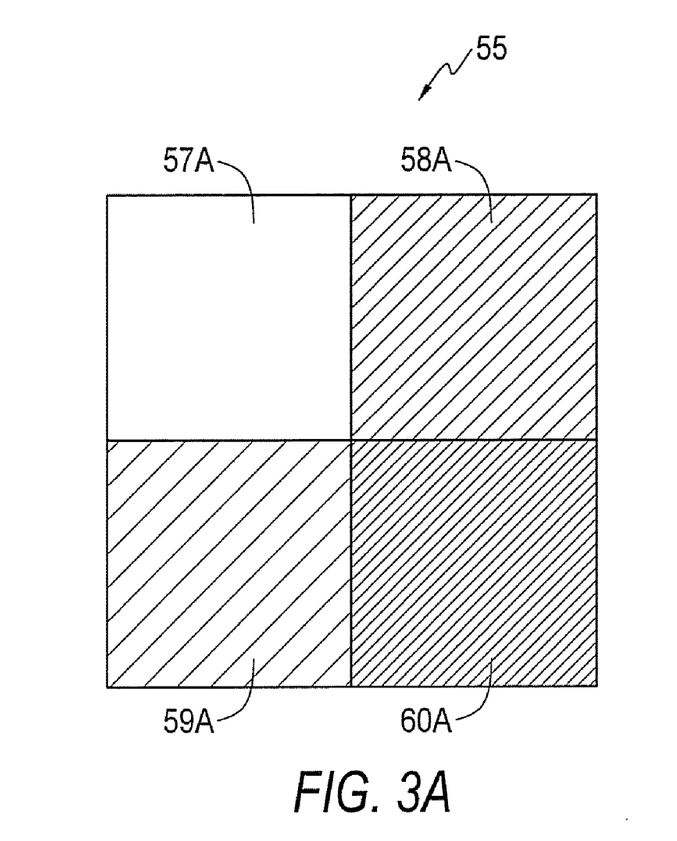
FIG. 3A illustrates an image having portions with different levels of brightness.

FIG. 3A illustrates an image 55 divided into portions 57A, 58A, 59A and 60A (each shaded differently to represent various grey scale brightness levels). Portion 57A is at a maximum (i.e. 100%) brightness level, portion 58A is at a 50% brightness level, portion 59A is at a 67% brightness level and portion 60A is at a minimum (i.e. 0%) brightness level.

Figure 3B:
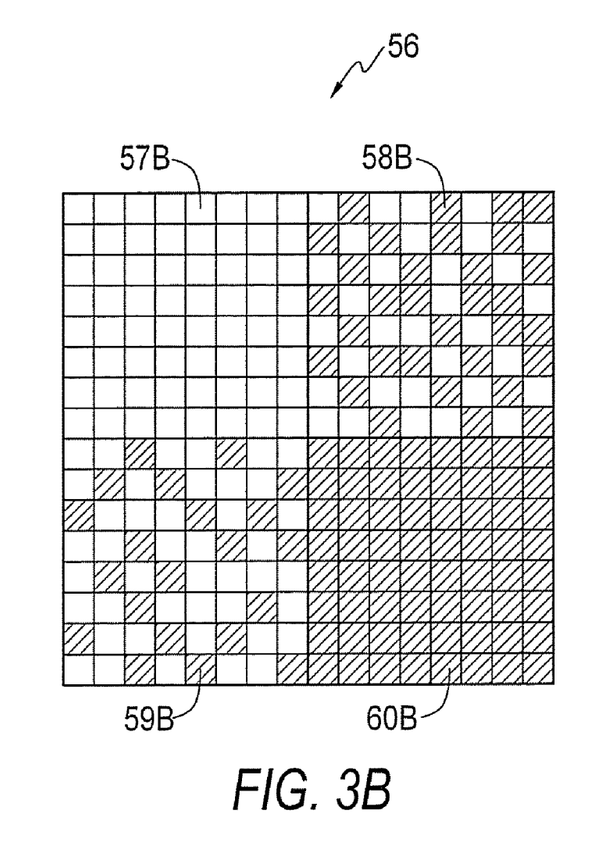
FIG. 3B illustrates an example of a dithering pattern for representing the image shown in FIG. 3A.

FIG. 3B illustrates one example of a dithering pattern 56 that may be applied to first spatial light modulator 14 to yield a light field having portions with the brightness levels shown in FIG. 3A. Dithering pattern 56 has areas 57B, 58B, 59B and 60B each having an 8×8 array of pixels. Each pixel corresponds to one of the elements 16 of first spatial light modulator 14 which may be set to ON (shown as an unshaded pixel) or OFF (shown as a shaded pixel).

The brightness level of a portion of image 55 (FIG. 3A) determines the proportion of pixels in an ON or OFF state in a corresponding area of dithering pattern 56 (FIG. 3B). In area 57B, all of the pixels are set to ON to yield a maximum brightness level corresponding to portion 57A. In area 60B, all of the pixels are set to OFF to yield a minimum brightness level corresponding to portion 60A. In area 58B, 50% of the pixels are set to ON to yield a brightness level corresponding to portion 58A. In area 59B, 67% of the pixels are set to ON to yield a brightness level corresponding to portion 59A.

In addition to the dithering pattern shown in FIG. 3B, various other dithering patterns may be used to represent the image shown in FIG. 3A. For example, a different combination of pixels in area 58B may be set to ON (the combination comprising 50% of the total pixels in area 58B) to maintain the average brightness level of the area at 50%.

Block 48 predicts the amount of light 25 that will be incident on each element 22 of second light modulator 20 if the elements of first modulator 14 are set according to the pattern determined in block 46. This prediction may be made, for example, by applying a mathematical function which approximates the transfer function of transfer optics 26 to the pattern of light that would be produced at first spatial light modulator 14 by setting elements 16 according to the pattern determined in block 46.

The light field estimation of block 48 may be performed at various levels of detail. In some embodiments, the light field estimation of block 48 may comprise upsampling, if necessary, a spatially-dithered image produced in block 46 to a resolution matching (or exceeding) that of second spatial light modulator 20 and applying a smoothing function such as a blur filter or low-pass filter to the result. In some embodiments the blur filter has a small kernel, such as a 3×3 or 5×5 kernel. In some embodiments, the blur filter has a kernel not exceeding 5×5. The smoothing function approximates the transfer function of optics 26.

Block 50 determines the proportion of the incident light 25 that should be allowed to pass each element 22 of second light modulator 20 to yield a desired image. Block 50 may comprise, for example, dividing a brightness value specified by image data 43 for an element 22 by the brightness of the light 25 at that element 22 as estimated in block 48 to yield a value indicating how much the element 22 should attenuate the incident light 25. The resulting set of values may be termed a 'correction mask' because it corrects the blurry light field incident on second spatial light modulator 25 to yield the desired image. Block 50 may optionally comprise subjecting the correction mask to a sharpening operation.

In block 52 the pattern derived in block 46 is applied to drive elements 16 of first modulator 14 and in block 54 the values derived in block 50 are applied to drive elements 22 of second modulator 20.

Blocks 52 and 54 occur at the same time. Where second modulator 20 comprises a DMD or other modulator having binary elements 22 then block 54 may comprise varying the proportion of time in which elements 22 are in their ON states. For example:

Elements 22 may be driven according to a suitable pulse-width modulation (PWM) scheme.

Elements 22 may be driven according to a scheme by which they are switched ON in each time period for a number of pulses which depends on the corresponding value.

Elements 22 may be turned ON at the beginning of each time period and then switched OFF after a portion of the time period has elapsed that depends on the corresponding value.

etc.

Elements 16 of first modulator 14 may remain set in their ON or OFF states as long as it is desired to display the image.

In an example embodiment, first spatial light modulator 14 substantially continuously displays a spatial dither pattern during a frame, transmission optics 26 blur and project the light from first spatial light modulator 14 onto second spatial light modulator 20 to yield a blurred grey scale image on second spatial light modulator 20 and the elements of second spatial light modulator are switched between their ON and OFF states during the frame to allow desired amounts of light to reach a viewer.

Method 40 may optionally be augmented, if desired, by controlling the brightness of light source 12 in response to the brightest portions of the image to be displayed. Where the overall image is dark and does not have any very bright parts, the intensity of light source 12 may be reduced. For images that include bright areas, light source 12 may be operated at its full intensity.

Figure 4:
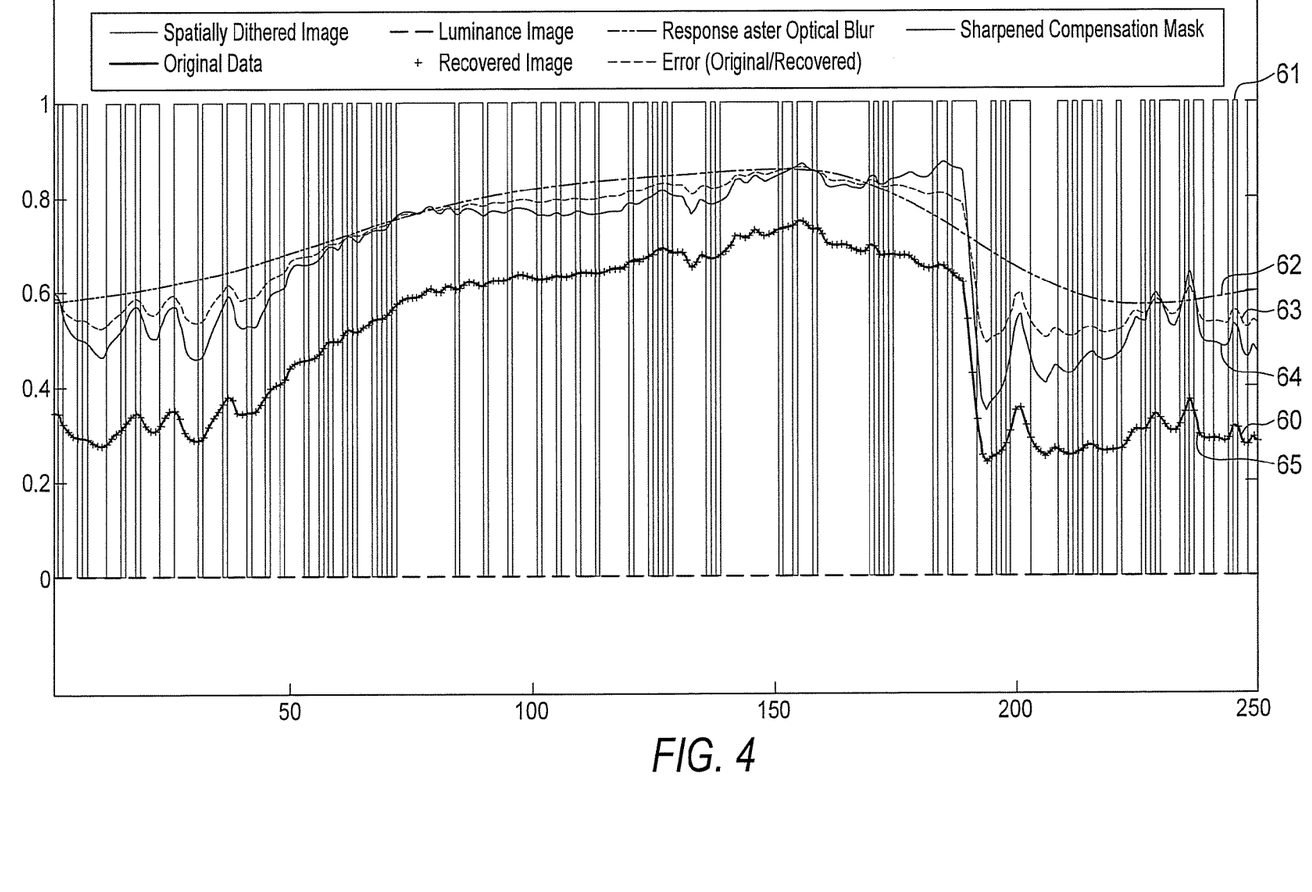
FIG. 4 is a graph illustrating the variation of various characteristics with position across an image.

FIG. 4 shows, for a line extending across an area of an example image, the following curves:

curve 60 representing the original image data;

curve 61 representing a spatially-dithered image (which would be present at second spatial light modulator 20 if transfer optics 26 focused an image of first spatial light modulator 14 onto second spatial light modulator 20);

curve 62 representing a luminance image at second spatial light modulator 20 resulting from the spreading of light in the spatially-dithered image by transfer optics 26;

curve 63 representing transmission levels for the elements of second spatial light modulator 20;

curve 64 representing transmission levels for the elements of second spatial light modulator 20 that have been sharpened; and curve 65 (which coincides with curve 60 representing the displayed image).

Displays which incorporate some or all of the concepts described herein can be implemented in a wide variety of ways. Advantageously, first spatial light modulator 14 does not need to be defect-free. Even if occasional individual elements 16 are stuck in their ON or OFF configurations, the blurring introduced by transfer optics 26 will ensure that a few such individual-element defects do not have a large adverse effect on the resulting image. If it is desired to explicitly accommodate defective elements then a number of options are possible including:

maintaining a defect map indicating the state of any defective elements 16 and taking these states into consideration when performing light field estimation (e.g. in block 48); and, maintaining a defect map indicating the state of any defective elements 16 and arranging the pattern of ON elements 16 to take these defective states into consideration. For example, if block 46 determines that in a particular area of first spatial light modulator 14 half of elements 16 ought to be ON and the other half of elements 16 ought to be OFF then block 46 may comprise attempting to include in the pattern as being ON those defective elements in the area that are stuck ON and including in the pattern as being OFF those defective pixels in the area that are stuck OFF.

Figure 5:
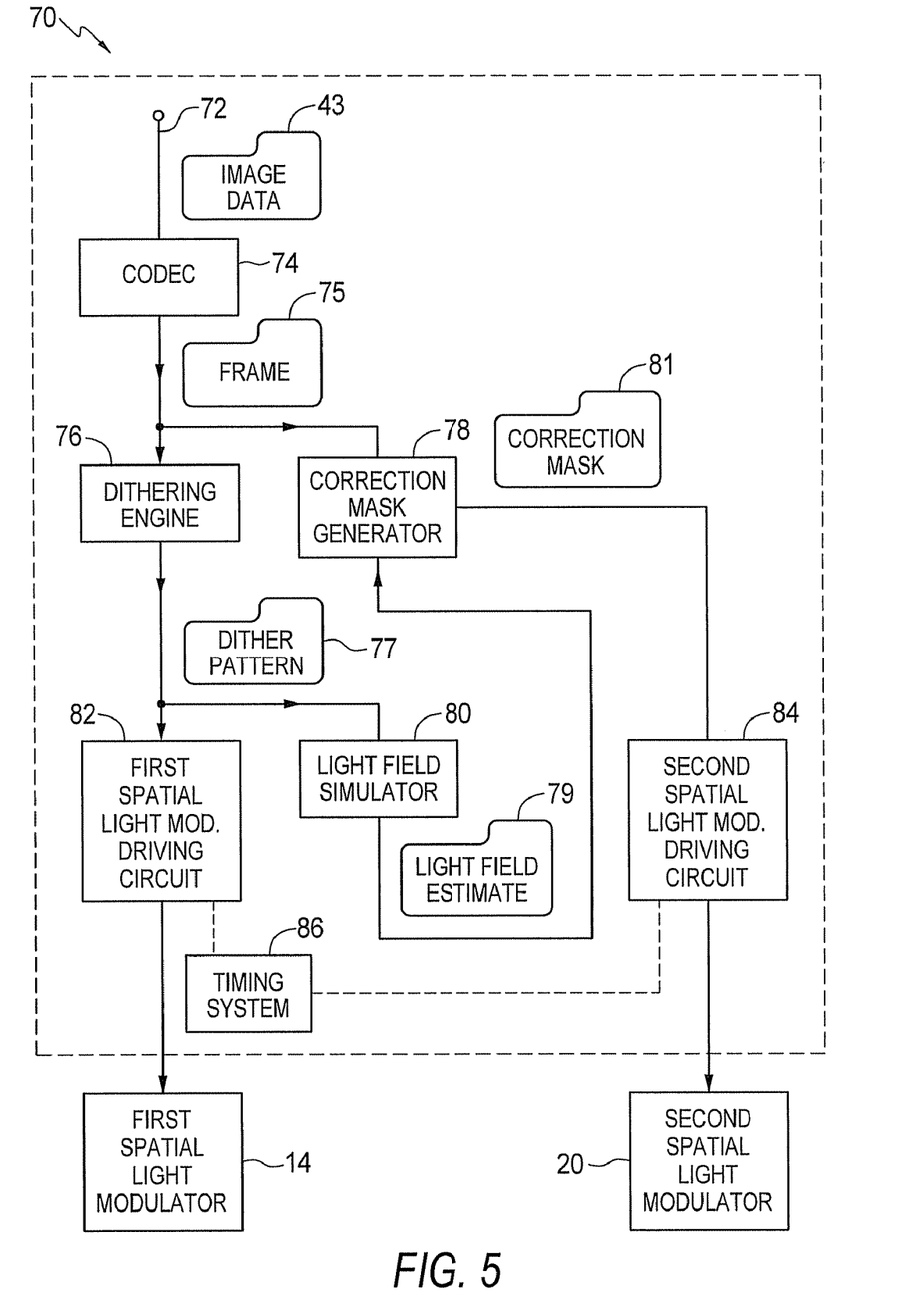
FIG. 5 is a block diagram of a controller for a display according to an example embodiment of the invention connected to control two spatial light modulators.

FIG. 5 illustrates a display controller 70 according to an embodiment of the invention. Display controller 70 may be applied to drive the first and second spatial light modulators of a display 10 for example. Display controller 70 has an input 72 which receives image data 43 defining an image to be displayed. A codec 74 extracts a frame 75 of the image from image data 43. Frame 75 is made up of data that specifies a luminance value or equivalent for each position (x,y) in the frame. The data making up the frame is made available to a dithering engine 76 and a correction mask generator 78.

Dithering engine 76 establishes a spatially-dithered pattern 77 at the resolution of first spatial light modulator 14 that corresponds to frame 75. Pattern 77 is made available to a light field simulator 80 and a first spatial light modulator driving circuit 82.

Light field simulator 80 estimates the light field at second spatial light modulator 20 corresponding to pattern 77. The estimate 79 is made available to correction mask generator 78. Correction mask generator 78 computes desired transmission values for the elements 22 of second spatial light modulator 20 to yield a correction mask 81 which is made available to a second spatial light modulator driving circuit 84. Correction mask generator 78 generates correction mask 81 based at least in part on frame data 75 and light field estimate 79.

First spatial light modulator driving circuit 82 is configured to set elements 16 of a first spatial light modulator 14 to be ON or OFF as specified by pattern 77 and to hold those elements in the selected state for the duration of a frame. Second spatial light modulator driving circuit 84 is configured to set the elements of second spatial light modulator 20 to have transmission values as specified by correction mask 81. Where second spatial light modulator 20 comprises a DMD, second spatial light modulator driving circuit 84 may rapidly switch elements 22 between their ON and OFF states such that a ratio between the ON time and OFF time for each element corresponds to a transmission value for the element as specified in correction mask 81. Second spatial light modulator driving circuit 84 may comprise a PWM DMD driver circuit for example. Circuits for driving DMDs are commercially available. One example is the DMD Discovery™ chipset available from Texas Instruments.

A timing system 86 coordinates the operation of apparatus 70 such that driving signals for a frame are applied to first and second spatial light modulators 14, 20 for the duration of the frame by driving circuits 82 and 84 respectively.

It is convenient but not mandatory that first spatial light modulator 14 be driven throughout a frame. For example, it would make no difference to the resulting image if first spatial light modulator 14 is not driven during any periods in which all elements of second spatial light modulator 20 are OFF.

The invention may be applied to color displays as well as to monochrome displays. This may be achieved in various ways. One approach is to display different colors in a time-multiplexed manner. This may be done by introducing different color filters into the optical path. For example, display 10 of FIG. 1 could be modified to include a color wheel.

Figure 6:
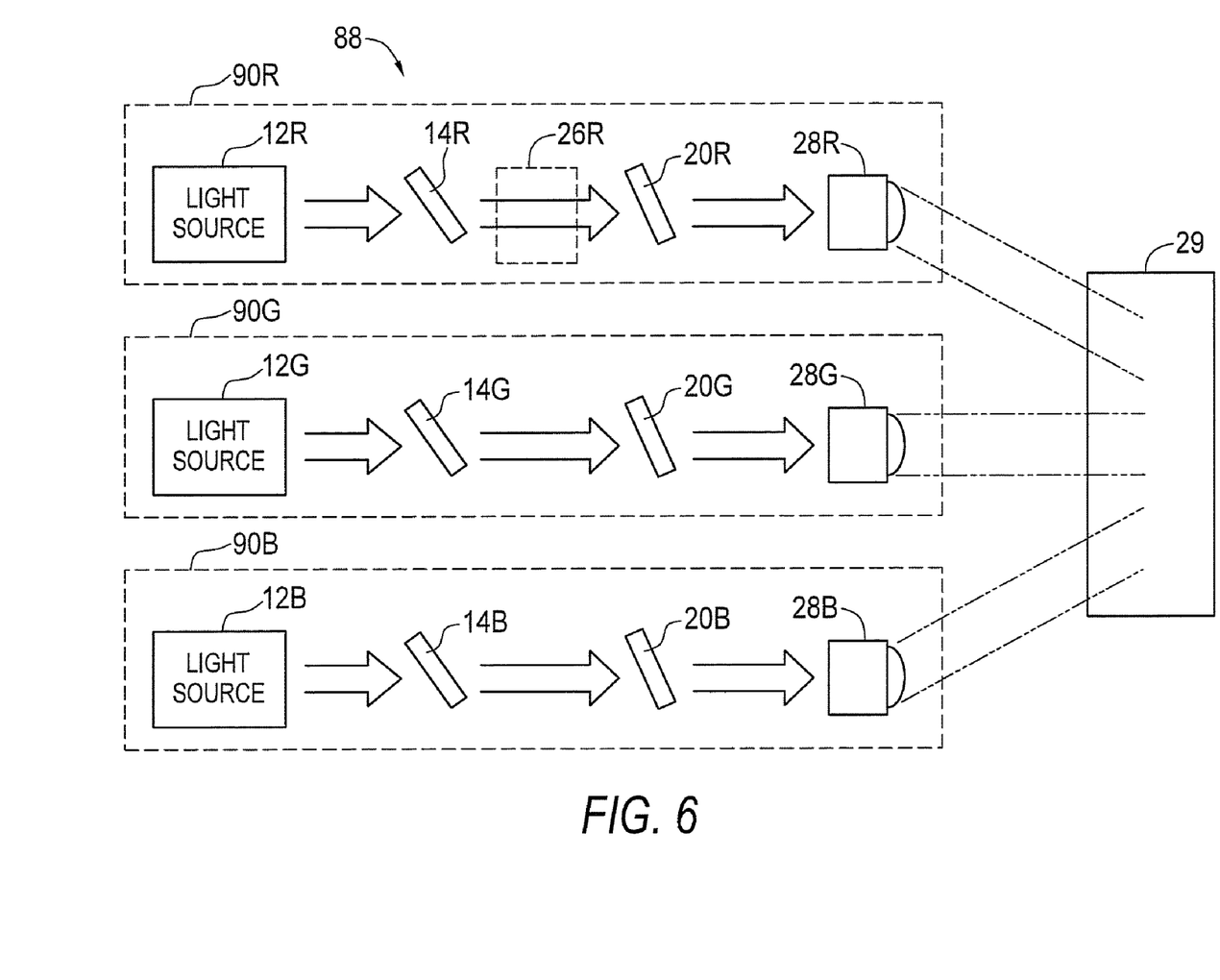
FIG. 6 is a schematic diagram illustrating a color display according to another embodiment of the invention.

In some color displays, a plurality of color channels (for example, red, green and blue channels) are processed separately and the light from the different color channels is combined at or upstream from a display screen to yield a color image. This invention may be practiced in this manner. For example, FIG. 6 shows a color display 88 having red, green and blue sections 90R, 90G and 90B (collectively sections 90) respectively. Each section 90 comprises a light source that produces light of the corresponding color. The light sources may be separate or may comprise suitable filters arranged to obtain light of the required color from a single white light source. In the illustrated embodiment, separate red green and blue light sources 12R, 12G and 12B are provided.

Each section 90 works in substantially the same manner as display 10 described above except that the sections 90 are driven in response to image data for the corresponding colors. The components of each section 90 are identified with the same reference numbers as the components of display 10 with an R, G or B appended respectively.

Figure 7:
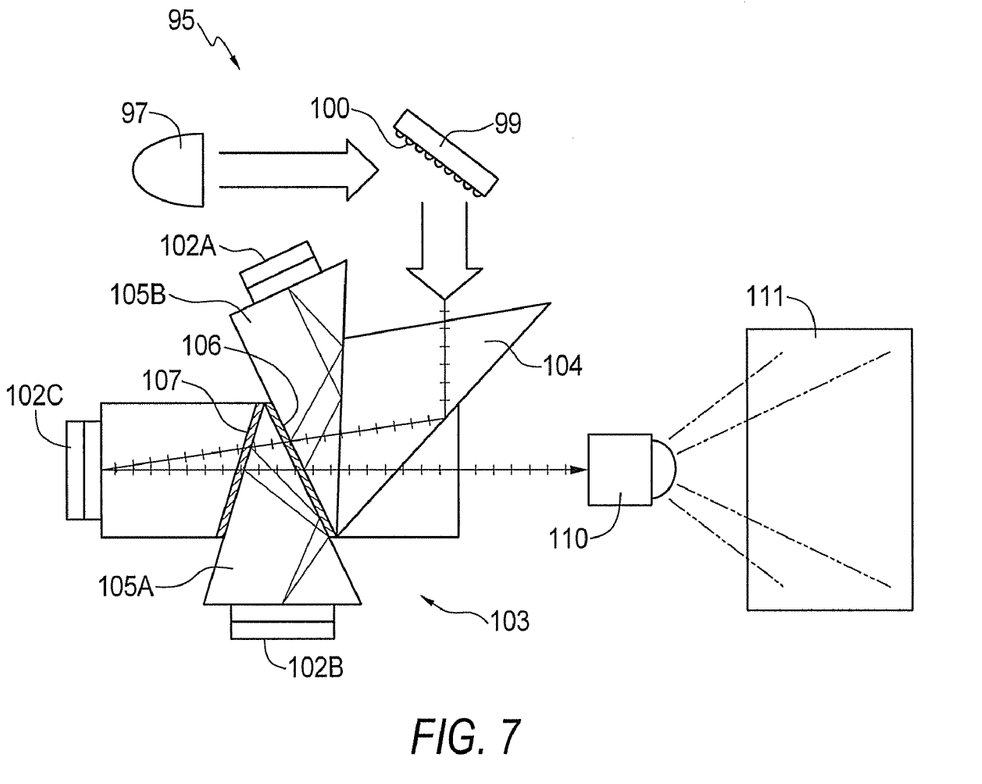
FIG. 7 is a schematic diagram illustrating a color display according to another embodiment of the invention.

FIG. 7 shows a color display 95 of an alternative design. Display 95 has a light source 97 that illuminates a first spatial light modulator 99. First spatial light modulator 99 comprises an array of elements 100 that are switchable between ON and OFF states. Light modulated by first spatial light modulator 99 is directed to three second spatial light modulators 102A, 102B and 102C (collectively second spatial light modulators 102) by way of transfer optics 103 that comprises prisms 104, 105A, 105B and filters 106 and 107.

Filters 106 and 107 cause light incident from first spatial light modulator 99 to be divided into three spectral components (for example, red, green and blue). Each spectral component is directed to and modulated by one of second spatial light modulators 102A, 102B and 102C (collectively second spatial light modulators 102). Each spectral component is characterized by a light field having a spatially-varying intensity that is determined by the pattern of elements 100 set to ON in first spatial light modulator 99. The light fields are blurred images of first spatial light modulator 99 as delivered by transfer optics 103.

Light that has been modulated by second spatial light modulators 102 passes out of prisms 104, 105A and 105B to a projection lens 110 and screen 111. Screen 111 may comprise a front-projection screen or a rear-projection screen.

During a frame, the elements of first spatial light modulator 99 of display 95 are set to display a pattern having a spatially-varying density. The density may be based upon image data for an image to be displayed. In some embodiments, the density of elements 100 that are set to ON in an area of first spatial light modulator 99 may be determined based upon luminance values determined from the image data. The particular patterns of elements 100 that are set to ON to achieve the desired densities may be determined by applying a suitable spatial-dithering algorithm or spatial-dithering engine, for example to the image data. The methods and apparatus described above for controlling first spatial light modulator 14 of display 10 may be applied with suitable modification for controlling first spatial light modulator 99 of display 95.

Second spatial light modulators 102A, 102B and 102C may be controlled in substantially the same manner as second light modulator 20 of display 10 with the exception that transmission values for the elements of second spatial light modulators 102A, 102B and 102C are determined based upon information in the image data for the corresponding spectral components.

Figure 8:
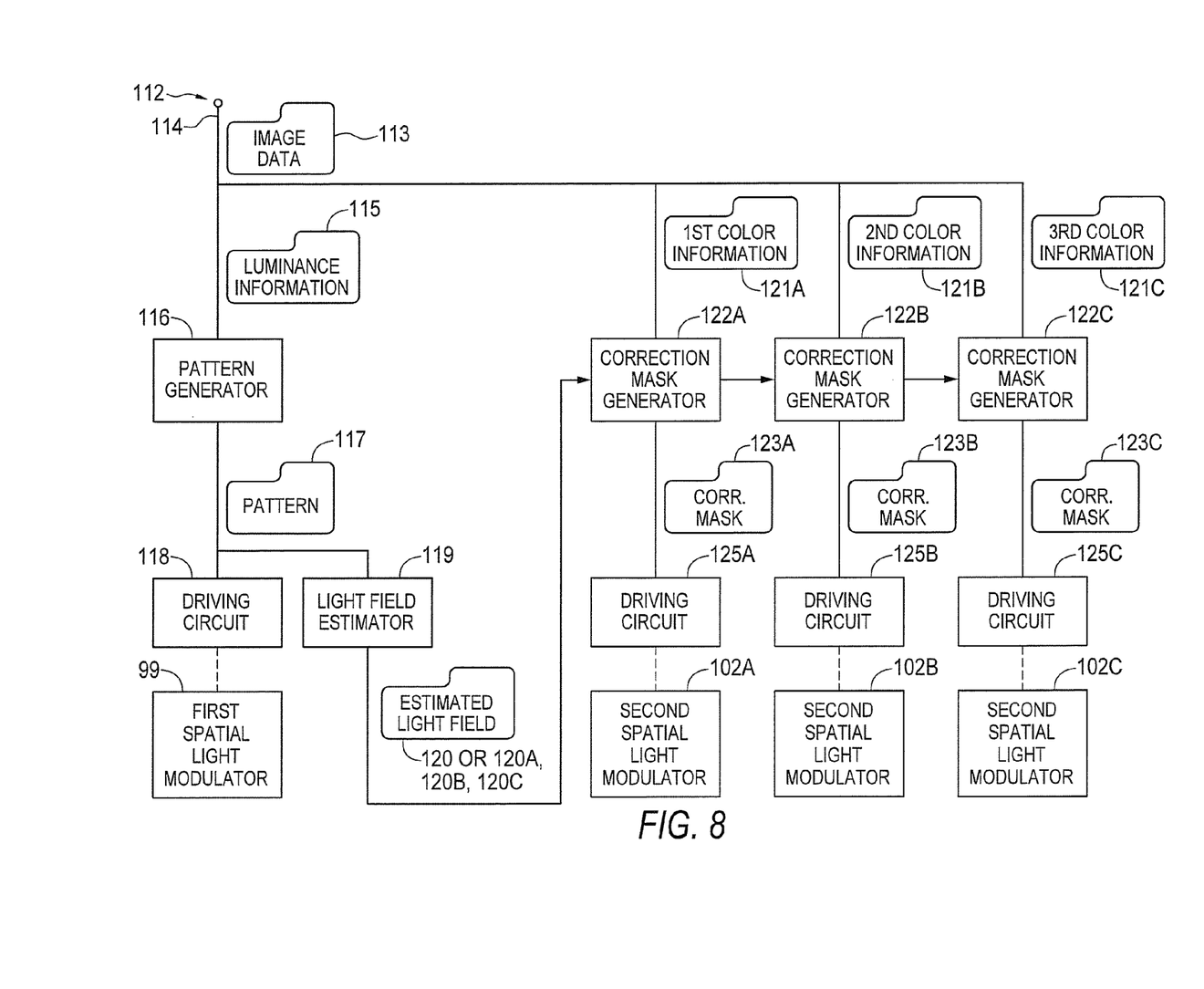
FIG. 8 is a block diagram of a controller according to another embodiment of the invention.

FIG. 8 is a block diagram of a control system 112 for a display like display 95. Image data 113 is received at input 114. Luminance information 115 for a frame is extracted and provided to a pattern generator 116. Pattern generator 116 outputs a pattern 117 having a spatially-varying density based on the luminance data. Pattern 117 is applied to a driving circuit 118 for first spatial light modulator 99.

Pattern 117 is also provided to light field estimator 119 which outputs an estimated light field 120. If the optical transmission characteristics of the optical paths between first spatial light modulator 99 and second spatial light modulators 102A, 102B and 102C are different, light field estimator 119 may generate a separate estimated light field (120A, 120B and 120C) corresponding to pattern 117 for each second spatial light modulator 102A, 102B and 102C.

Color information for a frame comprising first, second and third spectral component color information (121A, 121B and 121C respectively) and the corresponding estimated light field 120 (or 120A, 120B and 120C) are provided to correction mask generators 122A, 122B and 122C. Correction mask generators 122A, 122B and 122C generate correction masks 123A, 123B and 123C that are provided to driving circuits 125A, 125B and 125C (collectively driving circuits 125) which can drive second spatial light modulators 102A, 102B and 102C respectively.

A display like display 95 may be operated by a method similar to method 40 of FIG. 2.

In some embodiments, second spatial light modulators 102 are DMDs. In some embodiments driving circuits 125 are PWM driving circuits.

Figure 9:
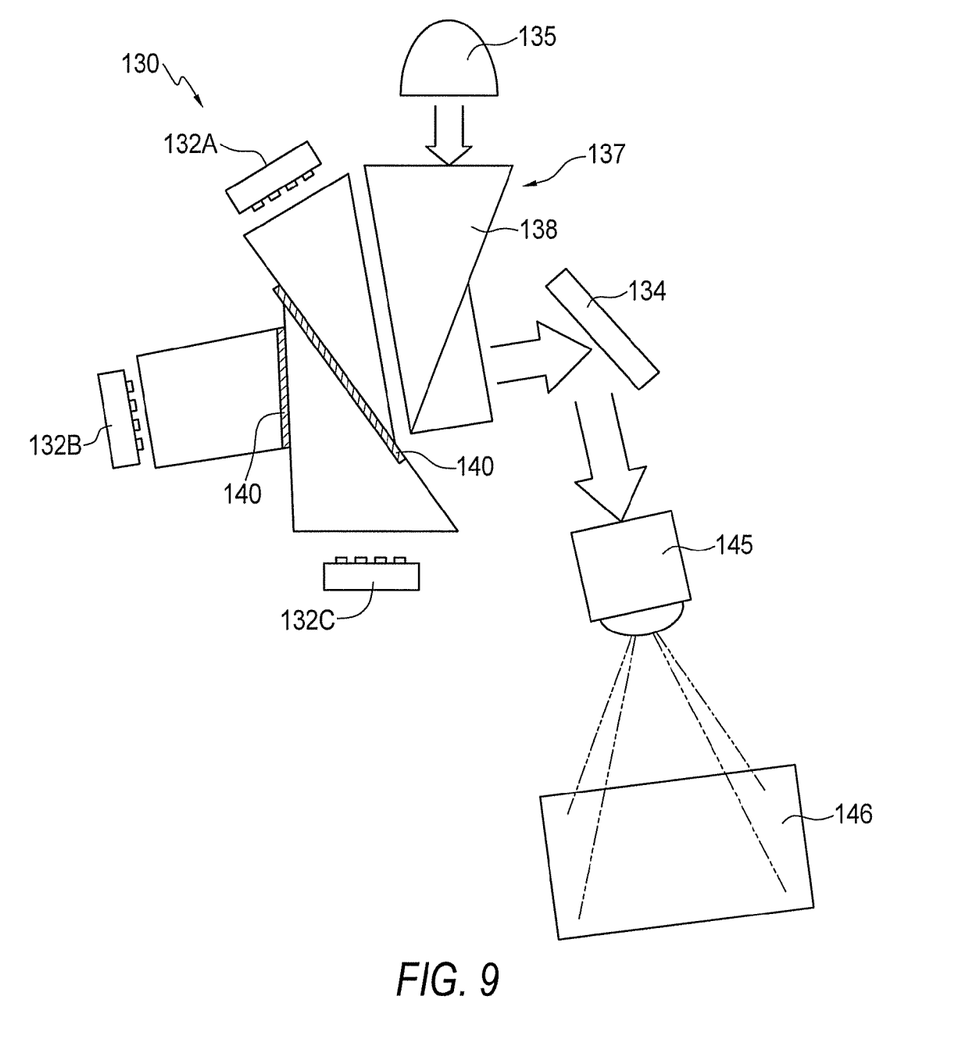
FIG. 9 is a schematic diagram illustrating a color display according to another embodiment of the invention.

FIG. 9 shows a color display 130 of another alternative design having a number of first spatial light modulators 132A, 132B and 132C (collectively first spatial light modulators 132) and a second spatial light modulator 134 that further modulates light from first spatial light modulators 132 after the light has been combined to form a color image. Display 130 has an optics subsystem 137 which receives light incident from light source 135. Optics subsystem 137 has a plurality of prisms 138 and filters 140 for dividing the light from light source 135 into three spectral components (for example, red, green and blue) and directing each spectral component to a corresponding one of first spatial light modulators 132A, 132B and 132C. Each of first spatial light modulators 132A, 132B and 132C has an array of elements that are switchable between ON and OFF states for modulating light passed to the modulator. The light which is modulated by first spatial light modulators 132A, 132B and 132C is then combined into a color image and carried by transfer optics to second spatial light modulator 134. The transfer optics blur the light. Light that has been modulated by second spatial light modulator 134 passes to a projection lens 145 and screen 146.

First and second light modulators are driven in a manner that causes the image projected onto screen 146 to reproduce a desired image specified by image data.

To simplify the explanation of the embodiments of the invention described above, various elements that are commonly found in projectors and other DMD-based devices and that may also be present in displays according to this invention are not specifically described. Such elements are known to those of skill in the art of designing projection-type displays. Some examples are: power supplies, cold mirrors to direct infrared radiation out of the optical path, integrator rods to collect light for illuminating a DMD, bending optics, housings, user controls, etc.

As will be understood from the foregoing description, the are a number of cases in which the designs and methods described herein may be usefully applied. Some examples include:

A monochrome display in which a first binary light modulator modulates light from a light source and that light is further modulated by a second binary light modulator.

A color display in which a first binary light modulator modulates light from a light source, that light is further modulated by a second binary light modulator and the color of light form the light source is switched between sub-frames. For example, the light source may comprise separate red, green and blue light sources that each illuminate the first modulator only during a corresponding sub-frame or light from a white light source is directed to pass through a color wheel before it illuminates the first light modulator or the like. This color implementation has the advantage of simplicity but requires that the modulators can be updated at high speed to permit red-green- and blue-sub-frames to be displayed sequentially at a rate fast enough to provide a satisfactory viewing experience.

Separate first and second binary light modulators may be provided for each of a plurality of color channels. For example, separate red- green- and blue-color channels may each have first and second binary modulators arranged and operated as described herein. The images from the color channels may be optically superposed to achieve a color image. Light for each of the color channels may be provided from separate light sources or by splitting white light into the required number of color bands. Such embodiments may advantageously provide high brightness but can be more expensive to make (as they require 6 modulators and associated control circuitry and optics to control three color channels).

A first binary light modulator may modulate light from a light source that emits light having multiple color components. The light may then be split into separate color components and each of the color components (e.g. red-green- and blue components) are directed to a corresponding second binary light modulator. The light modulated by the second binary light modulators is combined to provide a color image. The first binary light modulator has a spatial resolution that is significantly lower than that of the second binary light modulators in some embodiments.

Separate first binary light modulators may be provided for each of a plurality of color channels. For example, separate red- green- and blue-color channels may each have a first binary modulator. Light for each color channel may be provided by a separate light source or by splitting light from a white or other multi-component light source into a plurality of color bands. Light modulated by the first binary light modulators may be optically combined and the combined light illuminates a second binary light modulator which modulates the combined light to provide a color image. The first and second binary modulators are arranged and operated as described herein. In some embodiments, the second spatial light modulator has a spatial resolution significantly less than that of the first spatial light modulators.

In either of the two immediately-preceding embodiments, a single binary light modulator, which may have a relatively low spatial resolution, acts on the combined image (luminance modulation only) while separate modulators provide modulation for each color channel. The color modulation provided by the separate modulators may have a relatively high spatial resolution.

In the embodiments described above in this paragraph, where the first and second binary modulators have different spatial resolutions, the lower-resolution one(s) of the binary modulators may, for example, have resolutions (e.g. numbers of controllable elements) that are a factor of 64 or more or, in some cases, 1024 or more lower than the spatial resolution of the higher-resolution modulator.

In some further embodiments, separate first binary light modulators are provided for each of a plurality of color channels. For example, separate red- green- and blue- color channels may each have a first binary modulator. Light for each color channel may be provided by a separate light source or by splitting light from a white or other multi-component light source into a plurality of color bands. Light modulated by the first binary light modulators may be optically combined and the combined light illuminates a second binary light modulator which modulates the combined light to provide a color image. The first and second binary modulators are arranged and operated as described herein. In this embodiment, the first binary light modulators which each modulate light in one color channel may have spatial resolutions that are smaller than that of the second spatial light modulator. Preferably, the spatial resolutions of the first color light modulators are at most about 2 to 6 times lower than the spatial resolution of the second spatial light modulator. The human visual system is more sensitive to local luminance changes than it is to local (high spatial frequency) color changes.

A first binary light modulator may modulate light from a light source. Light from the first binary light modulator may be blurred and passed to a second light modulator comprising an LCD panel or other modulator capable of controlling transmission of light continuously or in multiple steps over a reasonably wide range.

Light modulation methods as described herein may be performed on separate channels for left and right images in 3D digital cinema systems. The left and right images may be differently polarized, have different spectral characteristics or be displayed in a time interlaced manner. Suitable polarizing or spectral filters may be provided in each channel.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Where a controller for a display as described herein is implemented in software, the controller may comprise a data processor and software instructions stored on a tangible medium accessible to the data processor. The data processor may generate first signals for the control of one or more first spatial light modulators and second signals for the control of one or more second spatial light modulators by executing the software instructions to process image data to yield the first and second signals. In alternative embodiments, fixed or configurable hardware such as logic circuits or a field-programmable gate array (FPGA) are provided to perform some or all steps in processing the image data to yield the first and second control signals.

As will be apparent to those skilled in the art in the light of the foregoing disclosure, many alterations and modifications are possible in the practice of this invention without departing from the spirit or scope thereof. For example:

For any desired spatial density of ON elements in the first spatial light modulator (except for all elements ON or all elements OFF) there are a variety of patterns that can be applied to an area of the first spatial light modulator. It is possible to switch the elements of the first spatial light modulator to change the pattern of ON elements without varying the spatial density of ON elements during a frame without adversely impacting the displayed image.

Accordingly, the scope of the invention is to be construed in accordance with the substance defined by the following claims.

What is claimed is:

1. A display comprising:
a light source capable of directing light onto a first spatial light modulator, the first spatial light modulator comprising a plurality of first elements switchable between ON and OFF states,
transfer optics disposed to direct light modulated by the first spatial light modulator onto a second spatial light modulator, and
a driver configured to generate first and second control signals for the first and second spatial light modulators respectively based on image data,
wherein:
the driver is configured to generate a pattern based upon the image data, the pattern having a spatially-varying density;
the driver is configured to generate the first control signal so as to set elements of the first spatial light modulator according to the pattern;
the transfer optics are characterized by a transfer function that blurs light originating from the first spatial light modulator at the second spatial light modulator;
the second spatial light modulator comprises a plurality of elements switchable between ON and OFF states and the driver is configured to switch the elements of the second spatial light modulator between their ON and OFF states multiple times during an image frame; and
the driver is configured to estimate a light field at the second spatial light modulator corresponding to the pattern and to base the second control signals on the estimated light field.

2. A display according to claim 1 wherein the driver is configured to switch the elements of the second spatial light modulator between their ON and OFF states according to a binary pulse-width modulation scheme.

3. A display according to claim 1 wherein the driver comprises a digital low-pass spatial filter and is configured to estimate the light field by applying the digital low-pass spatial filter to the pattern.

4. A display according to claim 1 comprising a dithering engine wherein the first control signal comprises pattern output by the dithering engine.

5. A display according to claim 1 wherein the transfer optics comprise a lens arranged to generate an out-of-focus image of the first spatial light modulator at the second spatial light modulator.

6. A display according to claim 1 wherein the first and second spatial light modulators each comprise a digital mirror device.

7. A display according to claim 1 wherein the light source comprises a laser light source.

8. A display comprising:
means for generating light;
first means for binary modulation of the light, the first means comprising a plurality of first elements switchable between ON and OFF states;
means for blurring light modulated by the first means and directing the blurred light onto a binary spatial light modulator;
means for generating first control signals for the first means based on the image data, the means for generating first control signals comprising means for generating a pattern based upon the image data, the pattern having a spatially-varying density;
means for generating second control signals for the binary spatial light modulator based on the image data;
means for maintaining the elements of the first means in states according to the pattern while operating the binary spatial light modulator to modulate the blurred light according to the second control signals; and
means for estimating a light field of the blurred light at the binary spatial light modulator wherein the means for generating second control signals is responsive to both the image data and the estimated light field.

9. A method for displaying an image, wherein the method comprises:
setting elements of a first binary spatial light modulator according to a binary pattern based on the image, the pattern having a spatially-varying density;
blurring and transferring to a second spatial light modulator an image of the first binary light modulator to yield a light field at the second spatial light modulator;
computing an estimate of the light field corresponding to the pattern and controlling the second spatial light modulator according to the image data and the estimate of the light field; and
modulating the light field with the second spatial light modulator to yield a reconstruction of the image.

10. A method according to claim 9 wherein modulating the light field with the second spatial light modulator comprises performing temporal dithering of the light field by switching elements of the second spatial light modulator between ON and OFF states.

11. A method according to claim 9 wherein computing the estimate of the light field comprises applying a low-pass filter to the pattern.

12. A method according to claim 11 wherein the low-pass filter has a kernel of dimensions 5×5 or smaller.

13. A display according to claim 9 wherein the first spatial light modulator comprises an array of light emitters.

14. A display according to claim 13 wherein the light emitters comprise light-emitting semiconductor devices.

15. A display according to claim 9 wherein the display comprises a light source illuminating the first spatial light modulator and the elements of the first spatial light modulator pass light from the light source to the second spatial light modulator when in the ON states.

16. A display according to claim 9 wherein the first spatial light modulator comprises a digital mirror device.

17. A display according to claim 9 wherein the driver is configured to switch the elements of the second spatial light modulator between their ON and OFF states according to a binary pulse-width modulation scheme.

18. A controller for a display comprising first and second spatial light modulators, the controller configured to:
generate a first control signal for the first spatial light modulator to set each of a plurality of elements of the first spatial light modulator to an ON or OFF state according to a binary pattern having a spatially-varying density based on an image; and
generate a second control signal for the second spatial light modulator to switch each of a plurality of elements of the second spatial light modulator between ON and OFF states to perform temporal dithering of light incident on the element, wherein the second control signal is responsive to an estimated light field of light modulated by the first spatial light modulator and image data.

19. A controller according to claim 18, wherein the controller is configured to switch the elements of the second spatial light modulator between their ON and OFF states according to a binary pulse-width modulation scheme.

20. A controller according to claim 18, wherein the binary pattern is a dithering pattern generated by a dithering engine.

21. A display comprising:
a first spatial light modulator comprising a plurality of first elements switchable between ON states, wherein the elements emit light, and OFF states wherein the elements are dark,
transfer optics disposed to direct light from the first spatial light modulator onto a second spatial light modulator,
a driver configured to generate first and second control signals for the first and second spatial light modulators respectively based on image data,
wherein:
the driver is configured to generate a pattern based upon the image data, the pattern having a spatially-varying density;
the driver is configured to generate the first control signal so as to set elements of the first spatial light modulator according to the pattern;
the transfer optics are characterized by a transfer function that blurs light originating from the first spatial light modulator at the second spatial light modulator;
the second spatial light modulator comprises a plurality of elements switchable between ON and OFF states and the driver is configured to switch the elements of the second spatial light modulator between their ON and OFF states multiple times during an image frame; and
the driver is configured to estimate a light field at the second spatial light modulator corresponding to the pattern and to base the second control signals on the estimated light field.

22. A display according to claim 21 wherein the driver comprises a digital low-pass spatial filter and is configured to estimate the light field by applying the digital low-pass spatial filter to the pattern.

23. A display according to claim 21 comprising a dithering engine wherein the first control signal comprises pattern output by the dithering engine.

24. A display according to claim 21 wherein the transfer optics comprise a lens arranged to generate an out-of-focus image of the first spatial light modulator at the second spatial light modulator.

* * * * *